E. A. AND C. T. PFLUEGER.
FISHING TACKLE.
APPLICATION FILED JAN. 10, 1919.

1,339,832.

Patented May 11, 1920.
2 SHEETS—SHEET 1.

INVENTORS,
Ernest A. Pflueger
and Charles T. Pflueger
By Brockett and Hyde
ATT'YS.

UNITED STATES PATENT OFFICE.

ERNEST A. PFLUEGER AND CHARLES T. PFLUEGER, OF AKRON, OHIO, ASSIGNORS TO THE ENTERPRISE MANUFACTURING COMPANY, OF AKRON, OHIO, A CORPORATION OF OHIO.

FISHING-TACKLE.

1,339,832.

Specification of Letters Patent.

Patented May 11, 1920.

Application filed January 10, 1919. Serial No. 270,508.

*To all whom it may concern:*

Be it known that we, ERNEST A. PFLUEGER and CHARLES T. PFLUEGER, citizens of the United States, residing at Akron, in the county of Summit and State of Ohio, have invented certain new and useful Improvements in Fishing-Tackle, of which the following is a specification.

This invention relates to fishing tackle, and more particularly to combined spoons and hooks. The invention is an improvement upon the construction described in Patent No. 1,209,020, granted December 19, 1916, to Charles T. Pflueger.

In said patent the hook is positively connected to the spoon, but nevertheless, is free to assume various angular positions relative thereto, so that the hook can have movement more or less independent of the peculiar spoon movement. Under some circumstances it is desirable to more closely tie together the spoon and hook, so that they move together as a unit.

The present invention has for its object to improve the construction of said prior patent by providing means for more or less solidly securing the hook to the spoon, and which means is of simple construction and can be readily manipulated in a manner to either secure the hook to the spoon or leave it free to move relative thereto, as in said prior patent.

Further objects of the invention are in part obvious and in part will appear more in detail hereinafter.

Figure 1:
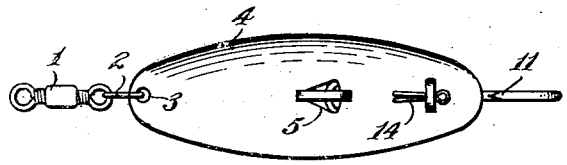
Figure 2:
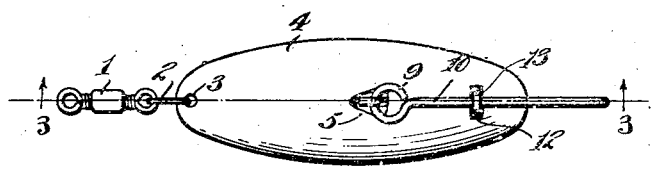
Figure 3:
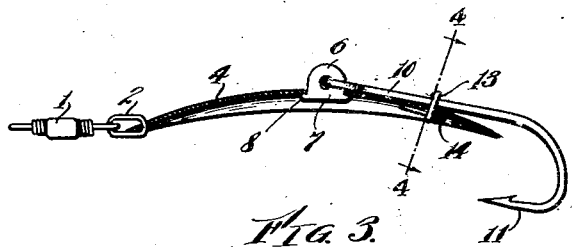
Figure 4:
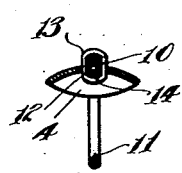
Figure 5:
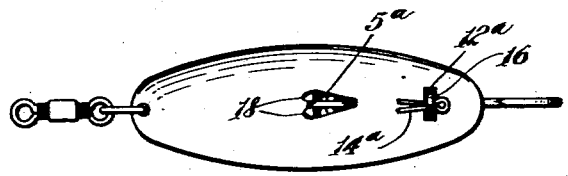
Figure 6:
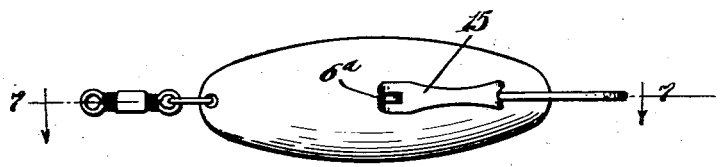
Figure 7:
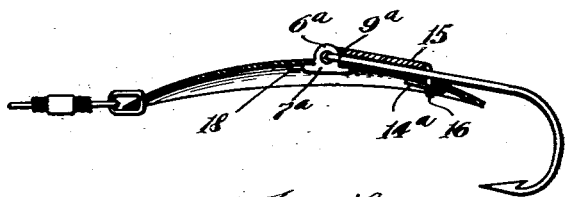
Figure 8:
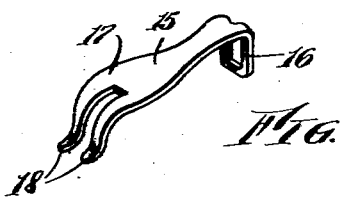

In the drawings Figure 1 is a plan view of the concave side of the spoon, showing one embodiment of the invention; Fig. 2 is a similar view of the convex side of the spoon; Fig. 3 is a longitudinal section on the line 3—3, Fig. 2; Fig. 4 is a detail cross section on the line 4—4, Fig. 3; Fig. 5 is a view corresponding to Fig. 1, showing another embodiment of the invention; Fig. 6 is a plan view of the convex side of the spoon shown in Fig. 5; Fig. 7 is a longitudinal sectional view on the line 7—7, Fig. 6; and Fig. 8 is a detail perspective view of a securing member.

Referring first to Figs. 1 to 4 inclusive, 1 represents the usual swivel, of well known form, said swivel being connected to a loop 2 which passes through an opening 3 in one end of the spoon 4. Said spoon near its center is provided with a sector shaped opening 5 to receive the eye 6 of an anchor member 7 having extensions 8 adapted to engage under the edges of the spoon at the opening 5. 10 represents the hook provided with the prong 11 at one end and at its opposite end with an eye 9 passing through the eye 6 of the anchor member.

The foregoing briefly describes the construction illustrated in the prior patent referred to, and to which the features of the present invention, now to be described, are applied.

According to the present invention suitable means is provided for securing the shank of the hook to the spoon between the opening 5 and the end of the spoon. As illustrated in Figs. 1 to 4 inclusive, the spoon is provided, between the opening 5 and the trailing end of the spoon, with a transverse slot 12 adapted to receive an oval loop or link 13. This link is slipped over the barbed end 11 of the hook to a position opposite the slot 12, and is then pushed down through said slot, in which position it is held by passing through said loop a cotter pin 14, whose ends may be spread in the usual manner to hold the parts in place. This arrangement, as shown in Fig. 3, rigidly holds the hook in place and prevents it from shifting relative to the spoon, so that the parts move together as a unit. By merely pulling out the cotter pin and taking off the link 13 the hook is left free to shift relative to the spoon, according to the invention of said prior patent, so that the beneficial effects of the prior invention may still be secured when desired.

Figs. 5 to 8 illustrate another embodiment of the invention, in which the securing means for the hook is designed to more rigidly secure the hook to the spoon. The securing member, illustrated in Fig. 8, has a body portion 15 provided at one end with a loop or eye 16. The opposite end of said body member is bent downwardly and is longitudinally bifurcated to form two tongues 17, whose outer ends are bent to form feet 18. This securing member is slipped over the barbed end of the hook in the same manner as the loop 13 and while the hook stands out perpendicular to the convex face of the spoon the prongs 17 are passed through the spoon opening 5ª, one on either side of the eye 6ª of the anchor member 7ª. The hook and securing member are then turned down to the position shown in Figs. 6 and 7, so that the eye 16 is passed through the slot 12ª, and a cotter pin 14ª is passed through said eye to secure the parts together.

With this construction the feet 18 of the prongs 17 engage under the edges of the opening 5ª, and the body portion 15 of the securing member lies over the flat eye 9ª of the hook. Consequently, the hook is held solidly against the spoon and is prevented from turning relative to the spoon about the axis of the straight portion of its shank.

It will further be observed that in the form shown in Fig. 1, the apex of the sector shaped opening points toward the leading end of the spoon, while in the form shown in Fig. 5 it points toward the trailing end of the spoon. Either form is suitable for use with either form of securing device for the spoon.

What we claim is:

1. Fishing tackle, comprising a spoon, a hook, means for anchoring the shank end of the hook to the spoon intermediate the ends of the spoon, and an additional securing device encircling the shank of the hook and removably secured to the spoon.

2. Fishing tackle, comprising a spoon, a hook having a shank, means for securing the eye end of the shank to the spoon, and an additional securing device encircling the shank of the hook between its eye and hook ends, and means for detachably securing said device to the spoon.

3. Fishing tackle, comprising a spoon, a hook having a shank, means for securing the end of the shank to the spoon intermediate its ends, additional securing means arranged between said first mentioned securing means and the free end of the spoon and constructed and arranged to hold the shank of the hook in substantial alinement with the longitudinal axis of the spoon, said additional means comprising a loop passing through an opening in the spoon and encircling the hook shank on one side of the spoon, and a removable locking device passing through the loop on the inner side of the spoon.

4. Fishing tackle, comprising a spoon, a hook having a shank, means for securing the end of the shank to the spoon intermediate its ends, additional securing means arranged between said first mentioned securing means and the free end of the spoon and constructed and arranged to hold the shank of the hook in substantial alinement with the longitudinal axis of the spoon, said additional means comprising a link passing through an opening in the spoon and engaging around the hook shank on the outer side of the spoon, and a cotter pin passing through said loop on the inner side of the spoon.

5. Fishing tackle, comprising a spoon having an opening therethrough, a hook, a coupling member anchored in said opening and having an eye to receive said hook, and additional securing means engaging said hook between said opening and the end of the spoon and adapted to also engage said coupling member for locking the same in place.

6. Fishing tackle, comprising a spoon having two openings therethrough, a hook, a coupling member anchored in one of said openings and having an eye to receive said hook, and a securing member for said hook having a body portion lying over said hook and at its opposite end portions passing through said openings.

In testimony whereof we affix our signatures.

ERNEST A. PFLUEGER.
CHARLES T. PFLUEGER.